(12) United States Patent
Takekoshi et al.

(10) Patent No.: US 12,051,833 B2
(45) Date of Patent: Jul. 30, 2024

(54) FUEL CELL SYSTEM

(71) Applicant: HONDA MOTOR CO., LTD., Tokyo (JP)

(72) Inventors: Sena Takekoshi, Wako (JP); Jin Nishio, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/102,820

(22) Filed: Jan. 30, 2023

(65) Prior Publication Data

US 2023/0246208 A1 Aug. 3, 2023

(30) Foreign Application Priority Data

Feb. 3, 2022 (JP) .................................. 2022-015362

(51) Int. Cl.
*H01M 8/04537* (2016.01)
*H01M 8/04089* (2016.01)
(Continued)

(52) U.S. Cl.
CPC ...... *H01M 8/04537* (2013.01); *H01M 8/04089* (2013.01); *H01M 8/04746* (2013.01); *H01M 8/04955* (2013.01)

(58) Field of Classification Search
CPC .......... H01M 8/04537; H01M 8/04089; H01M 8/04746; H01M 8/04955; H01M 8/04097; H01M 8/04164; H01M 8/04201; H01M 8/04231; H01M 8/04761; H01M 8/04228; H01M 8/04303; H01M 8/0444; H01M 8/04664; H01M 8/04753; H01M 8/04291; H01M 8/04313; H01M 8/04156; H01M 8/04179; H01M 8/04253; H01M 8/0438; H01M 8/04388; H01M 8/04402; H01M 8/04447; H01M 8/04462; H01M 8/04791; H01M 8/04798; H01M 8/04805; H01M 2250/20; H01M 2008/1095
See application file for complete search history.

(56) References Cited

U.S. PATENT DOCUMENTS

2011/0027678 A1 2/2011 Nuessle
2012/0301798 A1* 11/2012 Matsumoto ....... H01M 8/04097
429/444

(Continued)

FOREIGN PATENT DOCUMENTS

CN 112599819 A 4/2021
JP 2006-134771 A 5/2006
(Continued)

OTHER PUBLICATIONS

Office Action dated May 2, 2024 issued in the corresponding Chinese Patent Application 202310115854.3 with the English machine translation thereof.

*Primary Examiner* — Matthew W Van Oudenaren
(74) *Attorney, Agent, or Firm* — Carrier, Shende & Associates P.C.; Fulchand P. Shende; Joseph P. Carrier

(57) ABSTRACT

A fuel cell system monitoring fuel gas detection results of a gas sensor after outputting a valve-opening command signal to a first on-off valve and outputting a valve-closing command signal to the second on-off valve when an operation of a fuel cell stack is stopped and an oxygen-containing gas stops flowing through oxygen-containing gas supply flow path.

6 Claims, 6 Drawing Sheets

(51) Int. Cl.
*H01M 8/04746* (2016.01)
*H01M 8/04955* (2016.01)

(56) References Cited

U.S. PATENT DOCUMENTS

2017/0346117 A1\* 11/2017 Ojima ............... H01M 8/04228
2021/0104758 A1  4/2021 Tanimoto
2023/0187668 A1  6/2023 Okabe

FOREIGN PATENT DOCUMENTS

| JP | 2007-123116 | A | 5/2007 |
| JP | 2008-177116 | A | 7/2008 |
| JP | 2011-003465 | A | 1/2011 |
| JP | 2011-517021 | A | 5/2011 |
| JP | 2012-234806 | A | 11/2012 |
| JP | 2013-008664 | A | 1/2013 |
| JP | 2019-149225 | A | 9/2019 |
| JP | 2023-085613 | A | 6/2023 |

\* cited by examiner

FUEL CELL SYSTEM

CROSS-REFERENCE TO RELATED APPLICATIONS

This application is based upon and claims the benefit of priority from Japanese Patent Application No. 2022-015362 filed on Feb. 3, 2022, the contents of which are incorporated herein by reference.

BACKGROUND OF THE INVENTION

Field of the Invention

The present invention relates to a fuel cell system to be mounted on a moving object or the like.

Description of the Related Art

In recent years, fuel cells have attracted attention in various fields. For example, there is a fuel cell vehicle equipped with fuel cells. A fuel cell vehicle is powered by an electric motor running on electricity generated by electrochemical reactions in fuel cells. For this reason, there is no discharge of $CO_2$, $NO_x$, $SO_x$ and the like as in gasoline-powered vehicles, but only water is discharged, and therefore fuel cell vehicles are environmentally friendly. The fuel cell may be mounted on other moving objects such as ships, aircrafts, robots and so on, in addition to automobiles.

JP 2019-149225 A, for example, discloses a fuel cell system having a fuel cell. In the fuel cell system disclosed in JP 2019-149225 A, a fuel cell, an anode gas supply path, a circulation path, a purge path, a merge point, and a combustible gas sensor are provided in a housing.

The anode gas supply path is connected to an inlet of an anode of the fuel cell. One end of the circulation path is connected to an outlet of the anode of the fuel cell, and the other end of the circulation path is connected to the anode gas supply path. One end of the purge path is connected to the circulation path, and the other end thereof extends to the merge point. The hydrogen-containing gas discharged from the circulation path through the purge path is mixed with air at the merge point, and the mixed gas is discharged to the atmosphere outside the housing. The combustible gas sensor is a sensor that detects the concentration of hydrogen, and is disposed near the merge point.

In the fuel cell system disclosed in JP 2019-149225 A, when the purge valve provided in the purge path is opened, the output of the combustible gas sensor is monitored. When the output of the combustible gas sensor exceeds a threshold value, an abnormality of the fuel cell system is notified.

SUMMARY OF THE INVENTION

In the fuel cell system disclosed in JP 2019-149225 A, the purge valve is disposed near the gas-liquid separator. Therefore, when the fuel cell system is used in a cold district or the like, there is a possibility that the purge valve is stuck in an open state due to freezing. There is also a possibility that the purge valve is stuck in the open state due to an abnormality of the purge valve itself. However, in the fuel cell system disclosed in JP 2019-149225 A, it cannot be detected that the purge valve is stuck in the open state.

An object of the present invention is to solve the aforementioned problem.

To achieve the object, a fuel cell system according to an aspect of the prevent invention comprises: a fuel cell stack configured to generate power by electrochemical reactions between a fuel gas and an oxygen-containing gas; a casing covering the fuel cell stack; an oxygen-containing gas supply flow path configured to supply the oxygen-containing gas to the fuel cell stack, an oxygen-containing gas discharge flow path configured to discharge an oxygen-containing exhaust gas from the fuel cell stack; a bypass channel connecting the oxygen-containing gas supply flow path to the oxygen-containing gas discharge flow path so as to bypass the fuel cell stack; a branch channel branched from the bypass channel and configured to communicate with an inside of the casing; a drain channel configured to discharge a part of the fuel exhaust gas discharged from the fuel cell stack together with liquid water; an exhaust passage connected to a merge point of the oxygen-containing gas discharge flow path and the drain channel and configured to discharge the oxygen-containing exhaust gas and the liquid water to an outside; a first on-off valve disposed on the bypass channel; a second on-off valve disposed on the drain channel; at least one gas sensor configured to detect the fuel gas flowing toward the casing from the merge point; and a controller configured to monitor a fuel gas detection result of the gas sensor after outputting a valve open command signal to the first on-off valve and a valve close command signal to the second on-off valve, in a case where an operation of the fuel cell stack is stopped and the oxygen-containing gas stops flowing through the oxygen-containing gas supply flow path.

According to the aspect of the present invention, it is possible to detect that the second on-off valve is stuck in an open state. That is, if the second on-off valve is stuck in the open state, the fuel exhaust gas having flowed into the exhaust passage from the drain channel flows in a direction opposite to the flow direction of the liquid water in a state where the operation of the fuel cell stack is stopped and the oxygen-containing gas does not flow through the oxygen-containing gas supply flow path. Therefore, the fuel gas detection result of the gas sensor when the second on-off valve is stuck in the open state is larger than that when the second on-off valve is not stuck in the open state. By monitoring this detection result, it is possible to detect that the second on-off valve is stuck in the open state.

The above and other objects features and advantages of the present invention will become more apparent from the following description when taken in conjunction with the accompanying drawings in which a preferred embodiment of the present invention is shown by way of illustrative example.

DETAILED DESCRIPTION OF THE INVENTION

Figure 1:
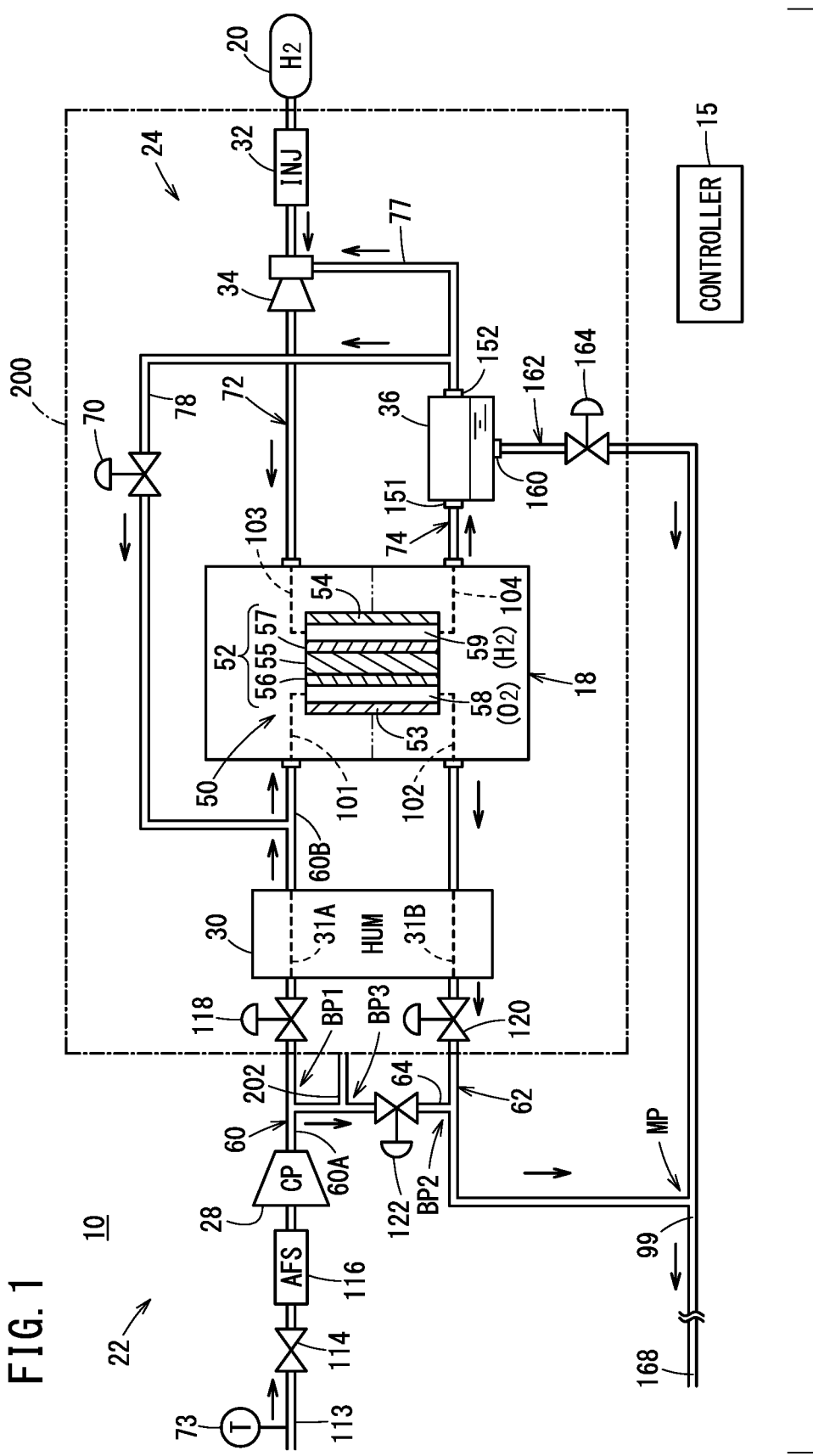
FIG. 1 is a schematic diagram showing a configuration of a fuel cell system according to an embodiment.

FIG. 1 is a schematic diagram showing a configuration of a fuel cell system 10 according to an embodiment. The fuel cell system 10 includes a fuel cell stack (also simply referred to as a fuel cell) 18, a hydrogen tank 20, an oxygen-containing gas supply device 22, and a fuel gas supplier 24.

The oxygen-containing gas supply device 22 includes a compressor (CP) 28 and a humidifier (HUM) 30.

The fuel gas supplier 24 includes an injector (INJ) 32, an ejector 34, and a gas-liquid separator 36. The injector 32 may be replaced with a pressure reducing valve.

In the fuel cell stack 18, a plurality of power generation cells 50 are stacked. Each of the power generation cells 50 includes a membrane electrode assembly 52, and a pair of separators 53, 54 that sandwich the membrane electrode assembly 52.

Each of the membrane electrode assemblies 52, for example, is equipped with a solid polymer electrolyte membrane 55 in which a thin film of perfluorosulfonic acid is impregnated with water, and an anode 56 and a cathode 57 sandwiching the solid polymer electrolyte membrane 55.

Each of the cathode 56 and the anode 57 has a gas diffusion layer (not shown) made from carbon paper or the like. An electrode catalyst layer (not shown) of a platinum alloy supported on porous carbon particles is coated uniformly on the surface of the gas diffusion layer. The electrode catalyst layer is formed on both surfaces of the solid polymer electrolyte membrane 55, respectively.

On the side of the one separator 53 that faces the membrane electrode assembly 52, a cathode side flow field (an oxygen-containing gas flow field) 58 in communication with an oxygen-containing gas supply passage 101 and an oxygen-containing gas discharge passage 102 is formed.

On the side of the other separator 54 that faces the membrane electrode assembly 52, an anode side flow field (a fuel gas flow field) 59 in communication with the fuel gas supply passage 103 and fuel gas discharge passage 104 is formed.

In the anode 57, by the fuel gas (hydrogen) being supplied, hydrogen ions are generated from hydrogen molecules by electrode reactions caused by catalyst, and the hydrogen ions pass through the solid polymer electrolyte membrane 55 and then move to the cathode 56, while electrons are released from hydrogen molecules. The electrons released from hydrogen molecules move to the cathode 56 through a positive terminal.

At the cathode 56, by action of the catalyst, the hydrogen ions and the electrons, and oxygen contained in the supplied oxygen-containing gas are reacted to produce water.

The compressor 28 is constituted by a mechanical supercharger or the like, and has functions such as sucking outside air (atmosphere, air) from an outside air intake hole 113, pressurizing it, and supplying it to the fuel cell stack 18 through the humidifier 30.

The humidifier 30 has a flow path 31A and a flow path 31B. Air (oxygen-containing gas) compressed, heated to a high temperature and dried by the compressor 28 flows through the flow path 31A. The exhaust gas discharged from the oxygen-containing gas discharge passage 102 of the fuel-cell stack 18 flows through the flow path 31B.

Here, while the bleed valve 70 is closed, the exhaust gas is a wet oxygen-containing off-gas (wet cathode off-gas, wet oxygen-containing exhaust gas), whereas while the bleed valve 70 is opened, the exhaust gas is a wet exhaust gas (off-gas) as a mixture of the wet oxygen-containing off-gas and a fuel off-gas (anode off-gas, fuel exhaust gas).

The humidifier 30 has a function of humidifying the oxygen-containing gas supplied from the compressor 28. That is, the humidifier 30 transfers moisture contained in the exhaust gas (off-gas) flowing through the flow path 31B to a supply gas (oxygen-containing gas) flowing through the flow path 31A via an internally provided porous membrane to supply a humidified oxygen-containing gas to the fuel cell stack 18.

A shut-off valve 114, an air flow sensor (AFS: flow rate sensor) 116, the compressor 28, a supply-side shut-off valve 118, and the humidifier 30 are provided on the oxygen-containing gas supply flow path 60 (including oxygen-containing gas supply flow paths 60A, 60B) extending from the outside air intake hole 113 to the oxygen-containing gas supply passage 101 in order from the outside air intake hole 113. The flow paths such as the oxygen-containing gas supply flow path 60 drawn by double lines are formed by pipes (the same applies to the following description).

The shut-off valve 114 is opened to allow and close to shut off intake of the air into the oxygen-containing gas supply flow path 60.

The air flow sensor 116 measures the flow rate of the oxygen-containing gas supplied to the fuel cell stack 18 through the compressor 28.

The supply-side shut-off valve 118 opens and closes the oxygen-containing gas supply flow path 60A.

The outside air intake hole 113 is provided with a temperature sensor 73 that detects (measures) an outside air temperature.

The humidifier 30 and a discharge-side shut-off valve 120 that also functions as a back pressure valve are disposed on the oxygen-containing gas discharge flow path 62 in communication with the oxygen-containing gas discharge passage 102 in this order from the oxygen-containing gas discharge passage 102.

A bypass channel 64 is provided between a suction inlet of the supply-side shut-off valve 118 and a discharge outlet of the discharge-side shut-off valve 120 to allow the oxygen-containing gas supply flow path 60 and the oxygen-containing gas discharge flow path 62 to communicate with each other. The bypass channel 64 is connected to the oxygen-containing gas supply flow path 60 and the oxygen-containing gas discharge flow path 62 to bypass the fuel cell stack 18. The bypass channel 64 is provided with a bypass valve 122 that opens and closes the bypass channel 64. The bypass valve 122 adjusts the flow rate of the oxygen-containing gas bypassing the fuel cell stack 18.

The hydrogen tank 20 is a container including a solenoid shut-off valve, and compresses highly pure hydrogen under high pressure, and stores the compressed hydrogen.

The fuel gas discharged from the hydrogen tank 20 flows through the injector 32 and the ejector 34 that are disposed on a fuel supply flow path 72, and is then supplied to an inlet of the anode flow field 59 of the fuel cell stack 18 through a fuel gas supply passage 103.

An outlet of the anode flow field 59 is connected to a gas supply hole 151 of the gas liquid separator 36 through a fuel gas discharge passage 104 and a fuel exhaust flow path 74, and a fuel off gas as a hydrogen-containing gas is supplied to the gas liquid separator 36 from the anode flow field 59.

The gas liquid separator 36 separates the fuel off gas into gaseous components and liquid components (water). The gaseous components of the fuel off-gas (fuel exhaust gas) are discharged from the gas discharge hole 152 of the gas-liquid separator 36 and supplied to the suction inlet of the ejector 34 through the circulating flow path 77. On the other hand, while the bleed valve 70 is opened, the fuel off-gas is also supplied to the oxygen-containing gas supply flow path 60B through the connecting flow path (communication flow path) 78 and the bleed valve 70.

The liquid components of the fuel exhaust gas are supplied from the liquid discharge hole 160 of the gas-liquid separator 36 through the drain channel 162 to the merge point MP with the oxygen-containing gas discharge flow path 62. The exhaust passage 99 is also connected to the merge point MP. The oxygen-containing exhaust gas supplied from the oxygen-containing gas discharge flow path 62 and the fuel exhaust gas supplied from the drain channel 162 are discharged from exhaust passage 99 to the outside through the exhaust gas opening 168.

Actually, a part of the fuel off-gas (hydrogen-containing gas) is discharged to the drain channel 162 together with the liquid components. In order to dilute the hydrogen gas in the fuel off-gas before discharging it to the outside, a part of the oxygen-containing gas discharged from the compressor 28 is supplied to the merge point MP through the bypass channel 64.

The bleed valve 70 provided in the connecting flow path 78 connecting the fuel off-gas circulation flow path 77 and the oxygen-containing gas supply flow path 60B is controlled to be opened in accordance with either of the following two control processes.

The first control process is that the bleed valve 70 is opened to prevent deterioration of the anode 57 caused by a decrease in the hydrogen concentration in the anode flow field 59 due to permeation of the nitrogen gas present in the cathode flow field 58 through the membrane electrode assembly 52 during movement of the moving object on which the fuel cell system 10 is mounted (first valve continuous opening control process of the bleed valve 70 during moving).

The second is that the bleed valve 70 is opened to reduce the hydrogen concentration in the exhaust gas discharged from the exhaust gas opening 168 to the outside while the operation state of the fuel cell stack 18 is idling, (second valve continuous opening control process of the bleed valve 70 in the idle state).

When the bleed valve 70 is opened, the fuel off-gas discharged from the fuel cell stack 18 through the fuel exhaust flow path 74 via the gas-liquid separator 36 flows to the cathode flow field 58 through the connecting flow path 78, the oxygen-containing gas supply flow path 60B, and the oxygen-containing gas supply passage 101.

The fuel gas in the fuel off-gas flowing through the cathode flow field 58 is ionized into hydrogen ions by catalytic reactions at the cathode 56, and the hydrogen ions react with the oxygen-containing gas to produce water. The remaining unreacted fuel off-gas (composed of nitrogen gas and a small amount of unreacted hydrogen gas) is discharged from the fuel cell stack 18 as the oxygen-containing off-gas, and flows through the oxygen-containing gas discharge flow path 62.

The oxygen-containing off-gas (including the unreacted remaining fuel off-gas) flowing through the oxygen-containing gas discharge flow path 62 is mixed with the oxygen-containing gas supplied through the bypass channel 64 to dilute the fuel off-gas (including the fuel gas) in the oxygen-containing off-gas to a lower concentration, and the resulting oxygen-containing off-gas flows through the merge point MP.

In the exhaust passage 99 connected to the merge point MP, the fuel gas in the mixed fluid of the liquid water and the fuel off-gas discharged from the drain channel 162 is diluted by the oxygen-containing off-gas from the oxygen-containing gas discharge flow path 62, and is discharged to the outside (atmosphere) through the exhaust gas opening 168.

The opening diameter of the bleed valve 70 is larger than that of the drain valve 164 provided in the drain channel 162. Due to the relationship between the opening diameters, even if the drain valve 164 is stuck in an open state by failure due to freezing or the like, the amount of the fuel off-gas flowing into the connecting flow path 78 becomes larger than the amount of the fuel off-gas flowing into the drain valve 164. As a result, the concentration of the fuel gas discharged from the exhaust gas opening 168 can be reduced.

Figure 2:
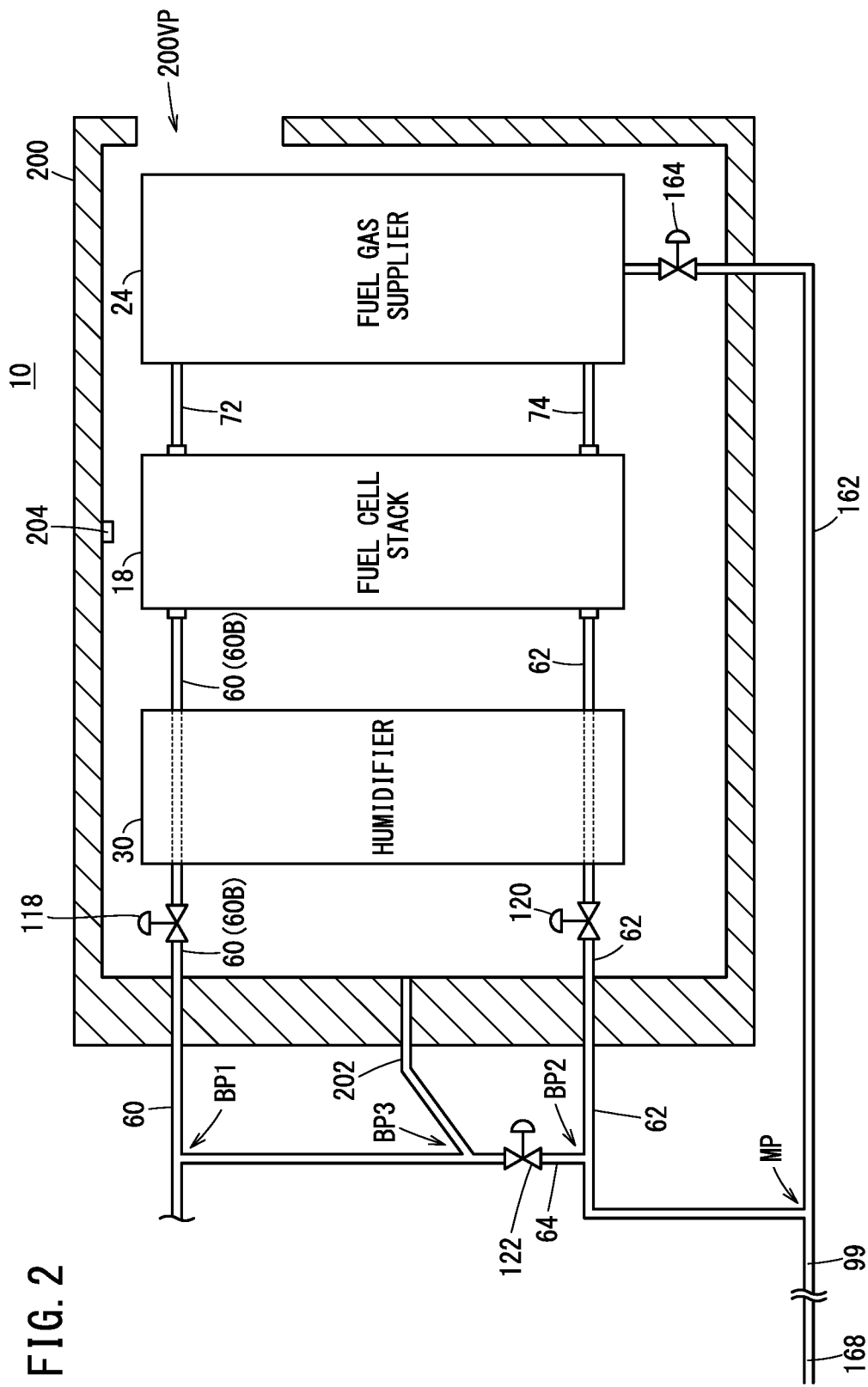
FIG. 2 is a view simply illustrating a part of the fuel cell system shown in FIG. 1.

FIG. 2 is a view simply illustrating a part of the fuel cell system 10 shown in FIG. 1. The fuel cell system 10 further includes a casing 200 and the controller 15 (FIG. 1). The casing 200 covers the humidifier 30, the fuel cell stack 18, and the fuel gas supplier 24. The casing 200 has a casing vent 200VP. The oxygen-containing gas supply flow path 60B, the oxygen-containing gas discharge flow path 62, and the drain channel 162 penetrate through a wall of the casing 200.

The inside of the casing 200 communicates with the branch channel 202. The branch channel 202 branches off from the bypass channel 64 and communicates with the inside of the casing 200. A part of the oxygen-containing gas flowing into the bypass channel 64 is supplied into the casing 200 through the branch channel 202. The oxygen-containing gas supplied into the casing 200 flows to the outside of the casing 200 through the casing vent 200VP. Therefore, the inside of the casing 200 is ventilated.

The bypass valve 122 is disposed outside the casing 200. The supply-side shut-off valve 118, a discharge-side shut-off valve 120, a drain valve 164, and a gas sensor 204 are disposed inside the casing 200. The bypass valve 122, the drain valve 164, the supply-side shut-off valve 118, and the discharge-side shut-off valve 120 are controlled by the controller 15 (FIG. 1).

The bypass valve 122 is a first on-off valve configured to be openable and closable. In the present embodiment, the bypass valve 122 is provided in the bypass channel 64 between the second connecting point BP2 and the third connecting point BP3. The second connecting point BP2 is a connecting point between the oxygen-containing gas discharge flow path 62 and the bypass channel 64. The third connecting point BP3 is a connecting point between the bypass channel 64 and the branch channel 202.

The drain valve 164 is a second on-off valve configured to be openable and closable. In the present embodiment, the drain valve 164 is provided in the drain channel 162 in the casing 200.

The supply-side shut-off valve 118 is a third on-off valve configured to be openable and closable. In this embodiment, the supply-side shut-off valve 118 is provided in a part of the oxygen-containing gas supply flow path 60 inside the casing 200 and between the first connecting point BP1 and the fuel cell stack 18. The first connecting point BP1 is a connecting point between the oxygen-containing gas supply flow path 60 and the bypass channel 64.

The discharge-side shut-off valve 120 is a fourth on-off valve configured to be openable and closable, and is provided in a part of the oxygen-containing gas discharge flow path 62 inside the casing 200 and between the second connecting point BP2 and the fuel-cell stack 18.

The gas sensor 204 is a sensor capable of detecting the fuel gas flowing toward the casing 200 from the merge point MP. The gas sensor 204 is provided on a gas path from the merge point MP to the casing 200 via the oxygen-containing gas discharge flow path 62 or the branch channel 202. This gas path includes the interior of casing 200.

In the present embodiment, the gas sensor 204 is provided inside the casing 200. The gas sensor 204 may be provided in the branch channel 202 near the interior of the casing 200.

The gas sensor 204 may be configured to be able to detect an amount, such as an absolute amount, of the fuel gas or may be configured to be capable of detect a concentration of the fuel gas. A detection result of the gas sensor 204 is output to the controller 15 (FIG. 1).

The above-described components of the fuel cell system 10 are collectively controlled by the controller 15. The controller 15 may be provided outside the casing 200 or may be provided inside the casing 200.

The controller 15 is configured by a computer including one or more processors (CPUs), a memory, an input/output interface, and an electronic circuit. The one or more processors (CPUs) execute a program (not illustrated) stored in the memory.

The processor (CPU) of the controller 15 performs operation control of the fuel cell system 10 by executing calculation in accordance with the program. The operation control includes control of the compressor 28, the supply-side shut-off valve 118, the discharge-side shut-off valve 120, the bypass valve 122, and the drain valve 164.

That is, when causing the fuel cell stack 18 to perform the power generation operation, the controller 15 supplies electromotive power to the compressor 28 to energize the compressor 28. In this case, the controller 15 controls the supply-side shut-off valve 118 and the discharge-side shut-off valve 120 to be in the open state. The controller 15 determines a target power generation amount based on at least one of the temperature, the voltage, and the power of the fuel cell stack 18, and adjusts the opening degree of the bypass valve 122 in accordance with the target power generation amount. Further, the controller 15 switches the drain valve 164 to either an open state or a closed state based on a water level sensor or the like in the gas-liquid separator 36 to keep the amount of the liquid component constant inside the gas-liquid separator 36.

When the power generation operation of the fuel cell stack 18 is executed, the controller 15 determines leakage of the fuel gas from the fuel cell stack 18 based on the detection result of the gas sensor 204. When the value obtained as the fuel gas detection result of the gas sensor 204 is less than the first threshold value, the controller 15 determines that there is no leakage of the fuel gas from the fuel cell stack 18. Conversely, when the value obtained as the fuel gas detection result of the gas sensor 204 is equal to or greater than the first threshold value, the controller 15 determines that there is leakage of the fuel gas from the fuel cell stack 18. The first threshold value is a threshold value set in advance for detecting leakage of the fuel gas from the fuel cell stack 18, and is stored in the memory of the controller 15.

When stopping the power generation operation of the fuel cell stack 18, the controller 15 stops the electromotive power supplied to the compressor 28 to de-energize the compressor 28. In this case, generally, the supply-side shut-off valve 118, the discharge-side shut-off valve 120, the bypass valve 122, and the drain valve 164 are controlled to a closed state. However, when the drain valve 164 is stuck in the open state due to freezing of the liquid water stored in the gas-liquid separator 36 or the like, it becomes uncontrollable.

In the present embodiment, in order to detect whether or not the drain valve 164 is stuck in the open state due to freezing or the like, the controller 15 controls the bypass valve 122 to the open state.

That is, when the operation of the fuel cell stack 18 is stopped and the oxygen-containing gas does not flow through the oxygen-containing gas supply flow path 60, the controller 15 outputs the valve closing command signal to the supply-side shut-off valve 118, the discharge-side shut-off valve 120, and the drain valve 164. On the other hand, the controller 15 outputs a valve opening command signal to the bypass valve 122. Thereafter, the controller 15 monitors the fuel gas detection result of the gas sensor 204. The valve closing command signal is a command signal for controlling the valve to the closed state. The valve opening command signal is a command signal for controlling the valve to the open state.

Figure 3:
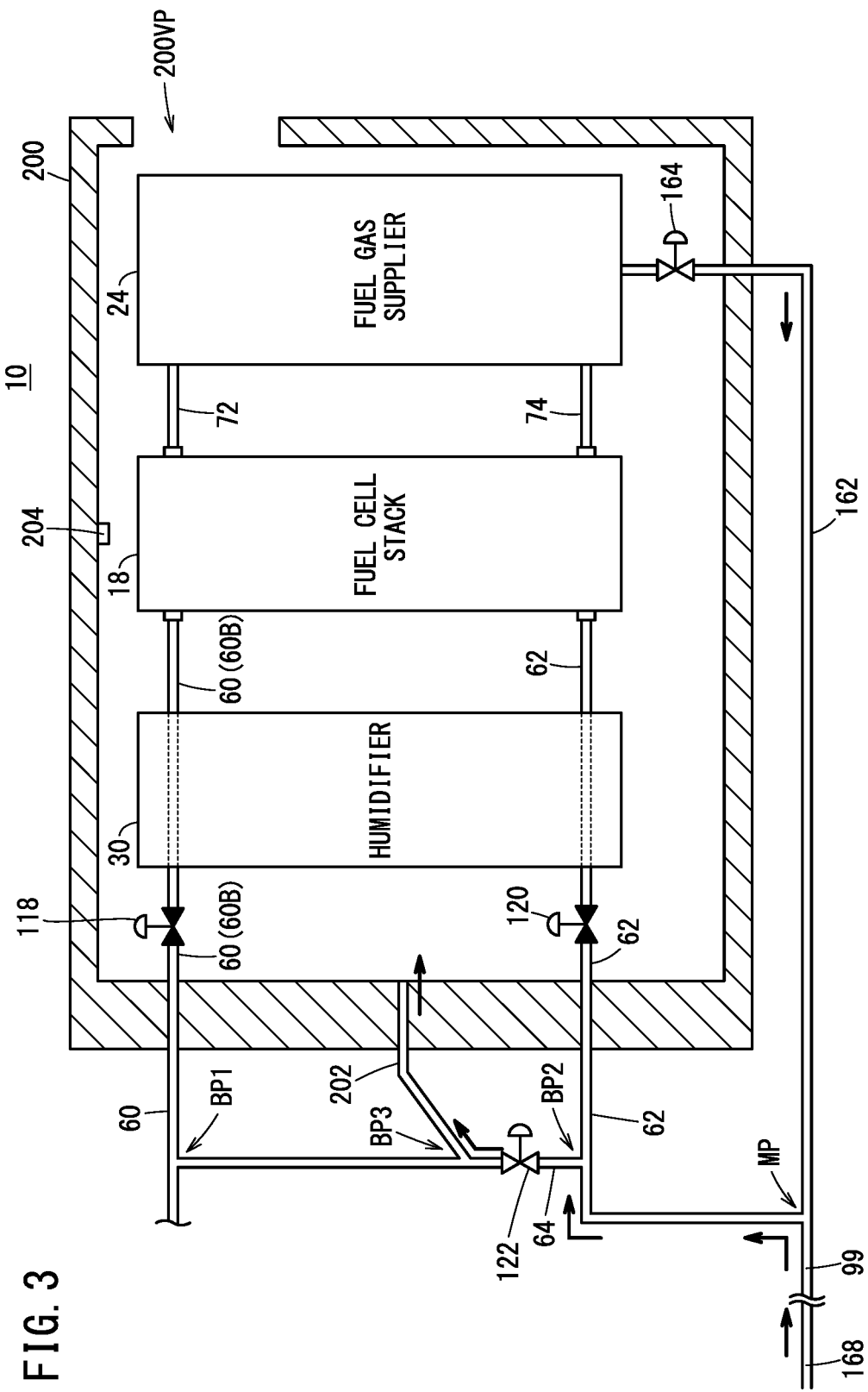
FIG. 3 is a view showing the flow of the fuel gas when a drain valve is stuck in the open state.

FIG. 3 is a view showing the flow of the fuel gas when the drain valve 164 is stuck in the open state. In the case where the drain valve 164 is stuck in the open state, the liquid water stored in the gas-liquid separator 36 is discharged to the outside from the exhaust gas opening 168 via the drain channel 162 and the exhaust passage 99.

On the other hand, the fuel off-gas (hydrogen-containing gas) flowing into the exhaust passage 99 through the drain channel 162 together with the liquid water flows in a direction opposite to the flow direction of the liquid water before reaching the exhaust gas opening 168. This is because when the operation of the fuel cell stack 18 is stopped, the compressor 28 is not energized and the oxygen-containing gas does not flow through the oxygen-containing gas supply flow path 60 and the bypass channel 64.

The reversely flowing fuel off-gas (hydrogen-containing gas) flows from the merge point MP into the bypass channel 64, and flows toward the casing 200 via the branch channel 202. Therefore, in the case where the drain valve 164 is stuck in the open state, the fuel gas detection result of the gas sensor 204 disposed inside the casing 200 is larger than in the case where the drain valve 164 is not stuck.

The controller 15 determines an abnormality of the drain valve 164 based on the fuel gas detection result of the gas sensor 204. When the value obtained as the fuel gas detection result of the gas sensor 204 is less than the second threshold value, the controller 15 determines that the drain valve 164 is in the normal state. The second threshold value is a threshold value set in advance for detecting that the drain valve 164 is stuck in the open state, and is stored in the memory of the controller 15. The second threshold may be the same value as the first threshold described above, or may be a value different from the first threshold.

Conversely, when the value obtained as the fuel gas detection result of the gas sensor 204 is equal to or greater than the second threshold value, the controller 15 determines that the drain valve 164 is in the abnormal state. In this case, the controller 15 controls a display device, a speaker, and/or a light-emitting device to notify that there is a possibility that the drain valve 164 is in an abnormal state due to freezing, failure, or the like. The display device, the speaker, and the light-emitting device may be provided in the moving object on which the fuel cell system 10 is mounted. The moving object is an automobile, a ship, an aircraft, a robot, or the like.

The above-described embodiment may be modified as follows.

Figure 4:
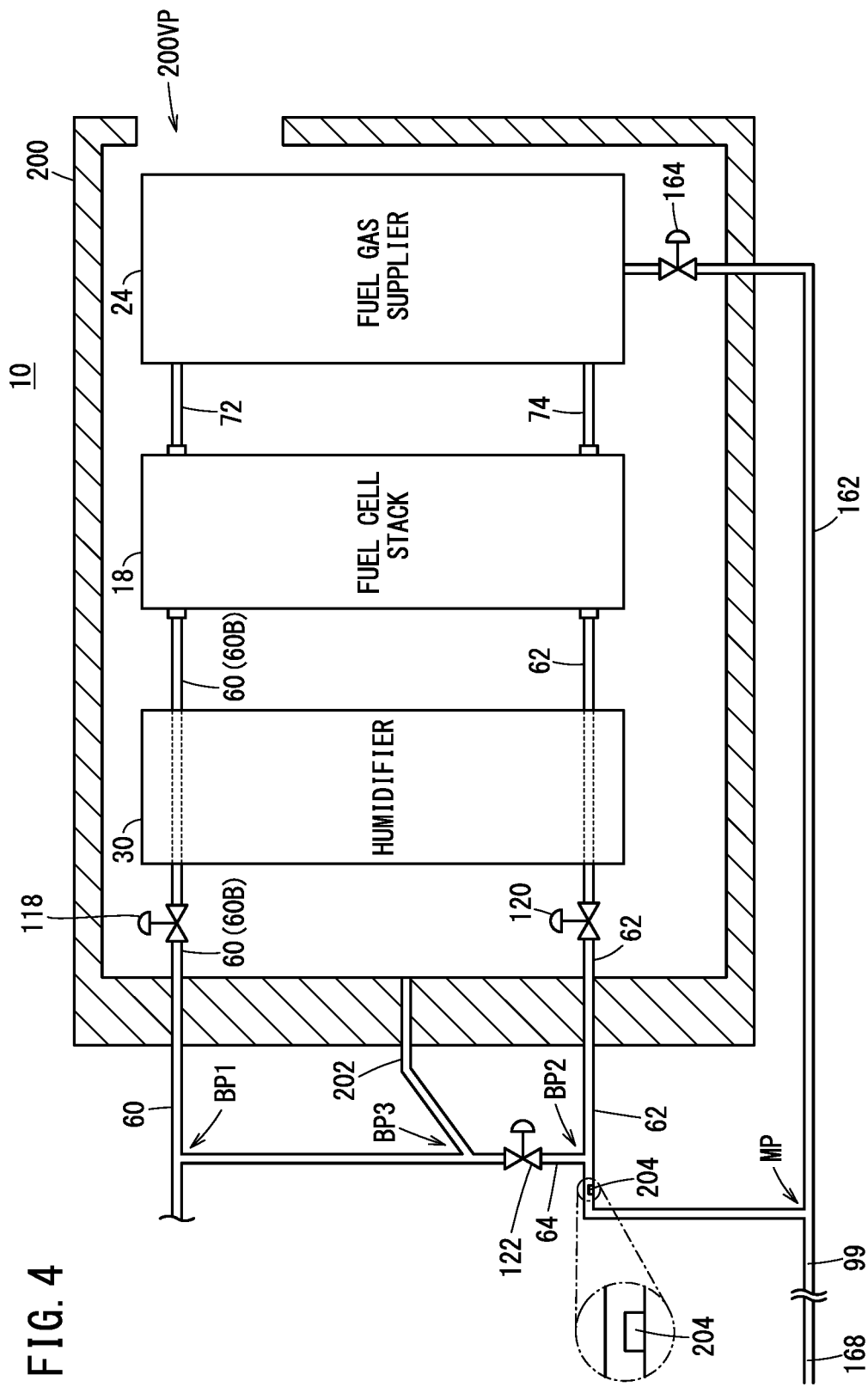
FIG. 4 is a view illustrating a part of the fuel cell system according to the first modification in a manner similar to FIG. 2.

FIG. 4 is a view illustrating a part of the fuel cell system 10 according to the first modification in a manner similar to FIG. 2. In FIG. 4, the same components as those described in the embodiment are denoted by the same reference numerals. In the present modification, description overlapping with that of the embodiment is omitted.

In the present modification, the gas sensor 204 is provided in the oxygen-containing gas discharge flow path 62 between the second connecting point BP2 and the merge point MP. In this arrangement, the fuel gas flowing back from the merge point MP can be detected by the gas sensor 204 before the fuel gas is distributed into various flow paths via the bypass channel 64. Therefore, it is possible to accurately detect that the drain valve 164 is in the abnormal state.

Figure 5:
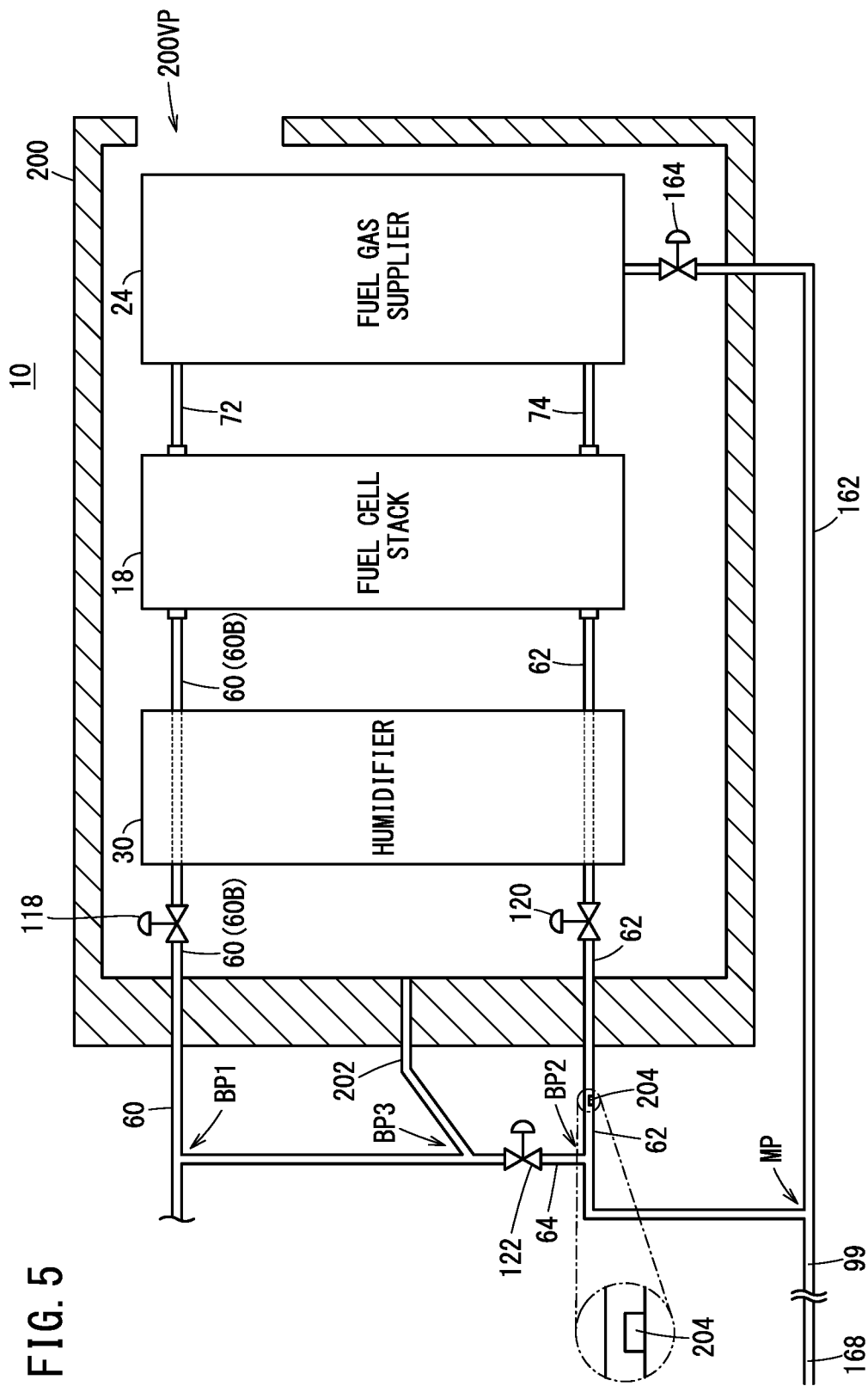
FIG. 5 is a view illustrating a part of the fuel cell system according to the second modification in a manner similar to FIG. 2.

FIG. 5 is a view illustrating a part of the fuel cell system 10 according to the second modification in a manner similar to FIG. 2. In FIG. 5, the same components as those described in the embodiment are denoted by the same reference numerals. In the present modification, description overlapping with that of the embodiment is omitted.

In the present modification, the gas sensor 204 is provided in the oxygen-containing gas discharge flow path 62 between the second connecting point BP2 and the discharge-side shut-off valve 120. Thus, it is possible to detect that the drain valve 164 and the discharge-side shut-off valve 120 are stuck in the open state.

Figure 6:
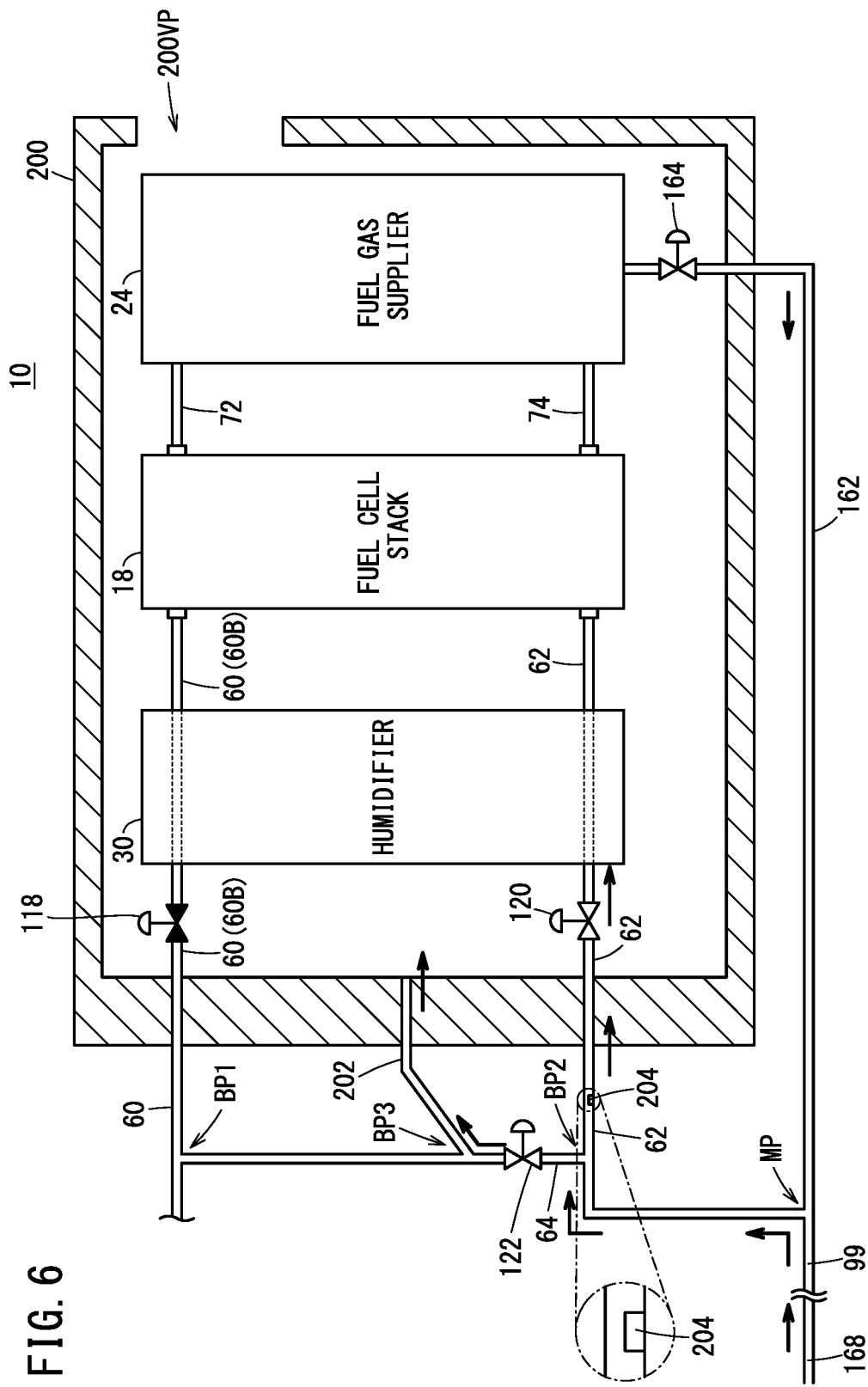
FIG. 6 is a view showing the flow of the fuel gas when the drain valve and a discharge-side shut-off valve are stuck in the open state.

FIG. 6 is a view showing the flow of the fuel gas when the drain valve 164 and the discharge-side shut-off valve 120 are stuck in the open state. When the drain valve 164 and the discharge-side shut-off valve 120 are stuck in the open state, the reversely flowing fuel off gas (hydrogen-containing gas) flows into both the bypass channel 64 and the oxygen-containing gas discharge flow path 62 from the merge point MP. Therefore, it is possible to detect that the drain valve 164 and the discharge-side shut-off valve 120 are stuck in the open state based on the detection result of the gas sensor 204 provided in the oxygen-containing gas discharge flow path 62 between the second connecting point BP2 and the discharge-side shut-off valve 120.

The gas sensors 204 of the embodiment, the first modification, and the second modification may be combined. In this case, the fuel cell system 10 includes a plurality of gas sensors 204.

Next, the invention and effects understood from the above embodiment and modifications will be described below. It should be noted that, for ease of understanding, some of constituent elements are labelled with the reference numerals of those used in the embodiment and modifications, but the present invention is not limited to such constituent elements labelled with the reference numerals.

(1) The prevent invention provides the fuel cell system comprising: the fuel cell stack (18) configured to generate electric power through electrochemical reactions between the fuel gas and an oxygen-containing gas; the casing (200) covering the fuel cell stack; the oxygen-containing gas supply flow path (60) configured to supply the oxygen-containing gas to the fuel cell stack, the oxygen-containing gas discharge flow path (62) configured to discharge the oxygen-containing exhaust gas from the fuel cell stack; the bypass channel (64) connecting the oxygen-containing gas supply passage to the oxygen-containing gas discharge passage so as to bypass the fuel cell stack; the branch channel (202) branched from the bypass channel and configured to communicate with an inside of the casing; the drain channel (162) configured to discharge a part of fuel exhaust gas discharged from the fuel cell stack together with liquid water; the exhaust passage (99) connected to the merge point (MP) of the oxygen-containing gas exhaust channel and the drain channel and configured to discharge the oxygen-containing exhaust gas and the liquid water to an outside; the first on-off valve (122) disposed on the bypass channel; the second on-off valve (164) disposed on the drain channel; at least one gas sensor (204) configured to detect the fuel gas flowing toward the casing from the merge point; and the controller (15) configured to monitor a fuel gas detection result of the gas sensor after outputting a valve open command signal to the first on-off valve and a valve close command signal to the second on-off valve in a case where the oxygen-containing gas stops flowing through the oxygen-containing gas supply flow path.

Thus, it is possible to detect that the second on-off valve is stuck in the open state. That is, if the second on-off valve is stuck in the open state, the fuel exhaust gas having flowed into the exhaust passage from the drain channel flows in a direction opposite to the flow direction of the liquid water in a state where the operation of the fuel cell stack is stopped and the oxygen-containing gas does not flow through the oxygen-containing gas supply flow path. Therefore, the fuel gas detection result of the gas sensor when the second on-off valve is stuck in the open state is larger than that when the second on-off valve is not stuck in the open state. By monitoring this detection result, it is possible to detect that the second on-off valve is stuck in the open state.

(2) In the fuel cell system according to the aspect of the invention, the gas sensor may be provided inside the casing or in the branch channel. Thus, if the fuel gas leaks from the fuel cell stack while the fuel cell stack is generating power, the leaked fuel gas can be detected. That is, the gas sensor can be used both for the purpose of detecting gas leakage from the fuel cell stack and for the purpose of detecting that the second on-off valve is stuck in the open state.

(3) The fuel cell system according to the aspect of the invention may further comprise: the third on-off valve (118) disposed between the first connecting point (BP1), at which the oxygen-containing gas supply flow path is connected to the bypass channel, and the fuel cell stack; and the fourth on-off valve (120) disposed between the second connecting point (BP2), at which the oxygen-containing gas discharge flow path is connected to bypass channel, and the fuel cell stack, wherein the gas sensor may be provided in the oxygen-containing gas discharge flow path between the second connecting point and the merge point, and the controller may output the valve-closing command signal to the third on-off valve and the fourth on-off valve when the operation of the fuel-cell stack is stopped. With this manner, the fuel gas flowing back from the merge point can be detected by the gas sensor before the fuel gas is distributed into various flow paths via the bypass channel. Therefore, it is possible to accurately detect that the second on-off valve is in the abnormal state.

(4) The fuel cell system according to the aspect of the invention may further include: the third on-off valve disposed on the oxygen-containing gas supply flow path between the first connecting portion, at which the oxygen-containing gas supply flow path is connected to the bypass channel, and the fuel cell stack; and the fourth on-off valve is disposed on the oxygen-containing gas discharge flow path between the second connecting portion, at which the oxygen-containing gas discharge flow path is connected to the bypass channel, and the fuel cell stack, wherein the gas sensor is provided in the oxygen-containing gas discharge flow path between the second connecting portion and the fourth on-off valve, and the controller may output the valve-closing command signal to the third on-off valve and the fourth on-off valve when the operation of the fuel cell stack is stopped. Accordingly, it is possible to detect that the second on-off valve and the fourth on-off valve are stuck in the open state.

The present invention is not limited to the above disclosure, and various modifications are possible without departing from the essence and gist of the present invention.

The invention claimed is:

1. A fuel cell system comprising:
   a fuel cell stack configured to generate electric power by electrochemical reactions between a fuel gas and an oxygen-containing gas;
   a casing covering the fuel cell stack;
   an oxygen-containing gas supply flow path configured to supply the oxygen-containing gas to the fuel cell stack,
   an oxygen-containing gas discharge flow path configured to discharge an oxygen-containing exhaust gas from the fuel cell stack;
   a bypass channel connecting the oxygen-containing gas supply flow path to the oxygen-containing gas discharge flow path so as to bypass the fuel cell stack;
   a branch channel branched from the bypass channel and configured to communicate with an inside of the casing;
   a drain channel configured to discharge a part of fuel exhaust gas discharged from the fuel cell stack together with liquid water;
   an exhaust passage connected to a merge point of the oxygen-containing gas discharge flow path and the drain channel and configured to discharge the oxygen-containing exhaust gas and the liquid water to an outside;
   a first on-off valve disposed on the bypass channel;
   a second on-off valve disposed on the drain channel;
   at least one gas sensor configured to detect the fuel gas flowing toward the casing from the merge point; and
   a controller configured to monitor a fuel gas detection result by the at least one gas sensor after outputting a valve open command signal to the first on-off valve and a valve close command signal to the second on-off valve, in a case where the oxygen-containing gas stops flowing through the oxygen-containing gas supply flow path.

2. The fuel cell system according to claim 1, wherein the at least one gas sensor includes a first gas sensor disposed inside the casing or in the branch channel.

3. The fuel cell system according to claim 1, further comprising:
   a third on-off valve disposed between a first connecting point, at which the oxygen-containing gas supply flow path is connected to the bypass channel, and the fuel cell stack; and
   a fourth on-off valve disposed between a second connecting point, at which the oxygen-containing gas discharge flow path is connected to bypass channel, and the fuel cell stack,
   wherein the at least one gas sensor is disposed in the oxygen-containing gas discharge flow path between the second connecting point and the merge point, and
   the controller outputs a valve close command signal to each of the third on-off valve and the fourth on-off valve when an operation of the fuel cell stack is stopped.

4. The fuel cell system according to claim 1, further comprising:
   a third on-off valve disposed on the oxygen-containing gas supply flow path between a first connecting portion, at which the oxygen-containing gas supply flow path is connected to the bypass channel, and the fuel cell stack; and
   a fourth on-off valve is disposed on the oxygen-containing gas discharge flow path between a second connecting portion, at which the oxygen-containing gas discharge flow path is connected to the bypass channel, and the fuel cell stack,
   wherein the at least one gas sensor is disposed in the oxygen-containing gas discharge flow path between the second connecting portion and the fourth on-off valve, and
   the controller outputs a valve close command signal to each of the third on-off valve and the fourth on-off valve when an operation of the fuel cell stack is stopped.

5. The fuel cell system according to claim 2, further comprising:
   a third on-off valve disposed on the oxygen-containing gas supply flow path between a first connecting portion, at which the oxygen-containing gas supply flow path is connected to the bypass channel, and the fuel cell stack; and
   a fourth on-off valve is disposed on the oxygen-containing gas discharge flow path between a second connecting portion, at which the oxygen-containing gas discharge flow path is connected to the bypass channel, and the fuel cell stack,
   wherein the at least one gas sensor includes a second gas sensor disposed in the oxygen-containing gas discharge flow path between the second connecting point and the merge point, and
   the controller outputs a valve-closing command signal to each of the third on-off valve and the fourth on-off valve when an operation of the fuel cell fuel cell stack is stopped.

6. The fuel cell system according to claim 2, further comprising:
   a third on-off valve disposed on the oxygen-containing gas supply flow path between a first connecting portion, at which the oxygen-containing gas supply flow path is connected to the bypass channel, and the fuel cell stack; and
   a fourth on-off valve is disposed on the oxygen-containing gas discharge flow path between a second connecting portion, at which the oxygen-containing gas discharge flow path is connected to the bypass channel, and the fuel cell stack,
   wherein the at least one gas sensor includes a second gas sensor disposed in the oxygen-containing gas discharge flow path between the second connecting portion and the fourth on-off valve, and
   the controller outputs a valve-closing command signal to each of the third on-off valve and the fourth on-off valve when an operation of the fuel cell stack is stopped.

* * * * *